Inventors
Franklin H. Grooms
Paul D. Wagner
By John P. Hine
Attorney

United States Patent Office 3,441,764
Patented Apr. 29, 1969

3,441,764
MULTIPLEX GENERATOR SYSTEM
Franklin H. Grooms, and Paul D. Wagner, Cincinnati, Ohio, assignors to Allis-Chalmers Manufacturing Company, Milwaukee, Wis.
Filed June 1, 1965, Ser. No. 460,379
Int. Cl. H02k *3/00, 19/00*
U.S. Cl. 310—198                                   5 Claims

ABSTRACT OF THE DISCLOSURE

A generator having a single rotating element and a single stationary element capable of producing two independent electrical powers. The stationary element and rotating element each having a pair of electrically insulated concentric radially aligned coil sets which are connected in a manner to provide a different number of poles for each coil set.

---

This invention pertains to a generator and more particularly to a multiplex generator wherein two or more independent electrical powers are simultaneously generated while utilizing only one armature core body and only one field core assembly.

In the past when it was necessary to provide two independent electric powers, two separate generators, each with an armature and a field were employed. In some instances the fields were both supported on a single shaft and the stators (armatures) were included in a single enclosure. However, in this type of arrangement the stators and fields were axially spaced from one another and required double the axial length of a single generator.

It is the intention and general object of this invention to provide a generator capable of producing at least two independent electrical powers which does not require the axial space normally occupied by juxtapositioned single generators.

A further object of the subject invention is to provide a multiplex generator capable of simultaneously generating at least two distinctly different electrical powers utilizing only one armature core body and only one field core assembly.

An additional object of the subject invention is to provide a multiplex generator of the hereinbefore described type wherein both the armature and field assembly each have at least two sets of electrically insulated coils.

A more specific object of the subject invention is to provide a multiplex generator of the hereinbefore described type wherein the coils of one coil set have different coil pitches from coils of another coil set so as to form at least two distinct generators, each having a different number of poles, to achieve a minimum amount of interaction between the electrical power outputs.

These and other objects of the subject invention will become more fully apparent as the following description is read in light of the attached drawings, wherein.

For convenience of description, the subject invention will be described in connection with a duplex generator wherein four and eight pole generators are utilized. It should be understood that other combinations can be effected and will be obvious to persons having skill in the art after the description of the embodiment shown herein is understood.

Figure 4:
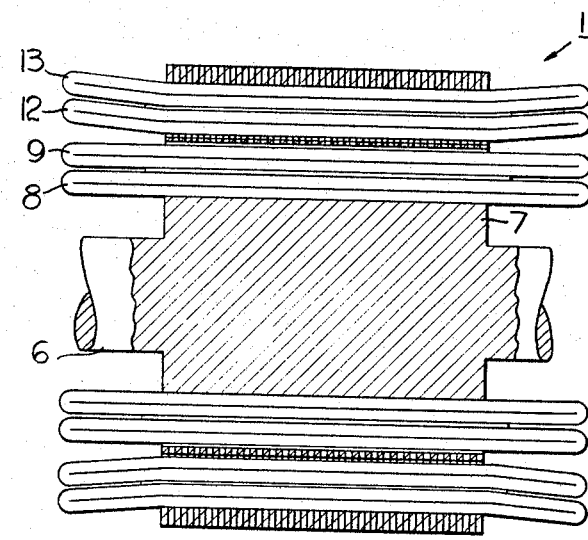
FIG. 4 is a longitudinal cross section taken through a generator constructed in accordance with the invention.

Referring to the attached drawing, and particularly FIG. 4, a rotating shaft 6 having a field core 7 thereon is shown. The field core is provided with a series of circumferentially spaced slots each slot having a pair of radially spaced coils 8 and 9 therein. These coils are electrically insulated from one another by means of insulation provided therebetween as is well known in the art. Each coil combines to form a set composed of one or more coils depending on the phase of the generator.

The armature assembly generally designated 11 is constructed in the conventional circular configuration and concentrically positioned about the generator field. The armature core or stator also has a plurality of circumferentially spaced slots on the inner peripheral surface thereof. Radially spaced coils 12 and 13 are contained within the slots. These coils are also electrically insulated from one another and combine to form a set of one or more coils depending on the phase of the generator.

It is the intention of this invention to cause the coils 12 and 13 of the armature to react with the field coils 8 and 9 in a manner to produce two independent electrical powers. These electric powers may be the same or different as is required. This is possible by constructing the individual windings so that the coil pitch or space between the coil sides is different in the armature coils and in a like manner is different in the field coils. As an example the field coil 8 and the stator coil 12 may be wound to effect an eight pole winding. The field coil 9 and the stator coil 13 may be wound to effect a four pole winding. In this manner, two independent and different electrical powers can be produced with a minimum of interaction therebetween.

Figure 3:
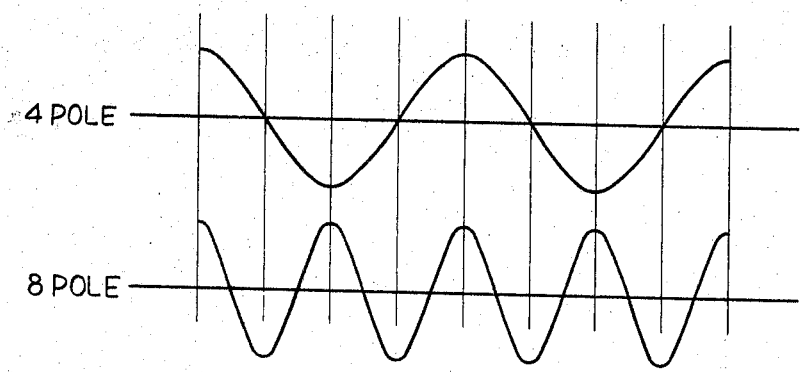
FIG. 3 is a graph showing two individual generator output voltages.

FIG. 3 shows the individual sine waves of both the four and eight pole machines.

Figure 1:
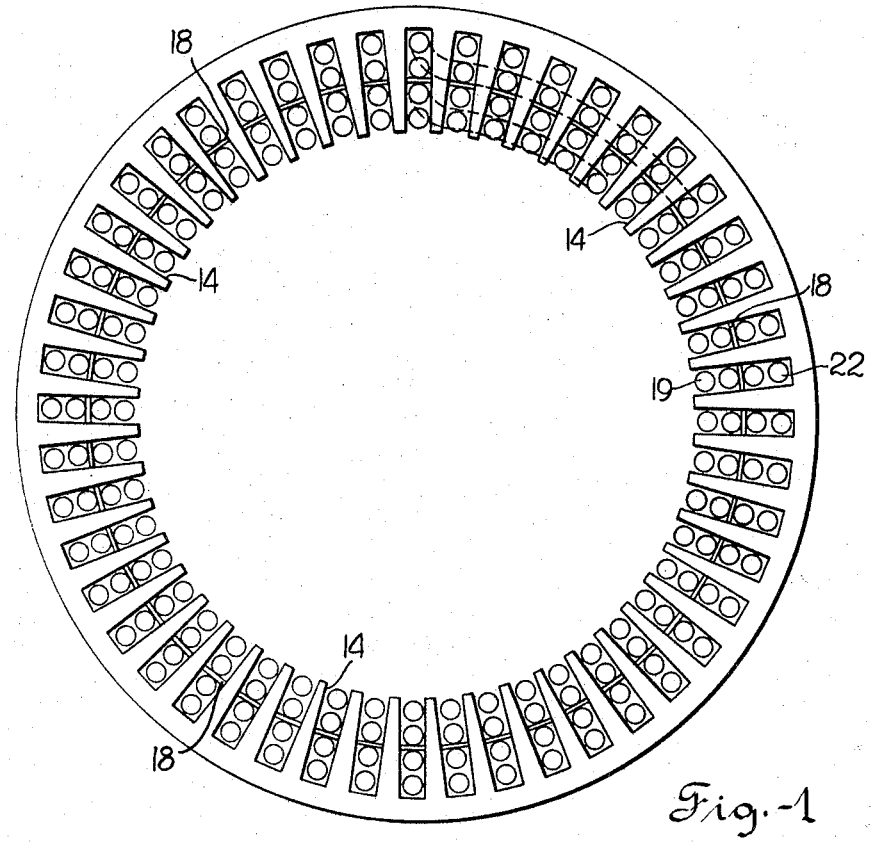
FIG. 1 is a transverse cross sectional schematic view showing an armature body constructed in accordance with the invention.
Figure 2:
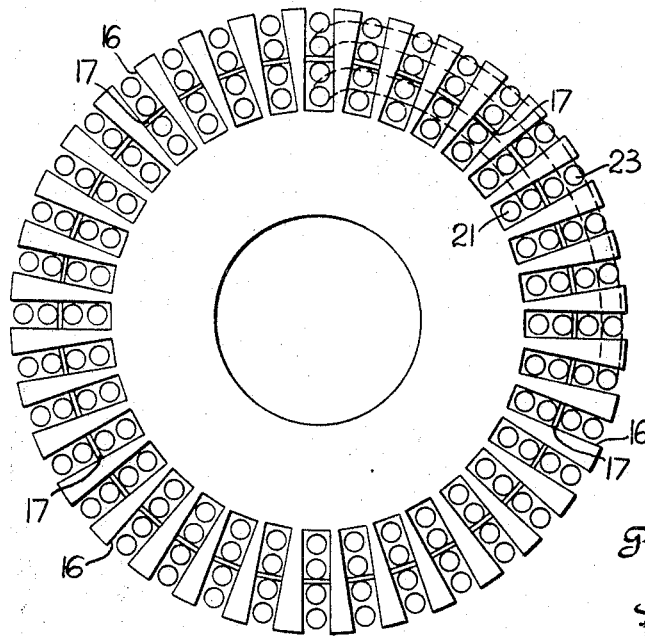
FIG. 2 is a transverse cross sectional schematic view showing a field assembly constructed in accordance with the invention.

Referring now to FIGS. 1 and 2, the armature or stator laminations in FIG. 1 has 48 circumferentially spaced slots 14 therein. The field body shown in FIG. 2 has 36 circumferentially spaced radially directed slots 16 therein. Each slot of both the field and stator have four coil sides therein and the windings are of the conventional lap winding. Each slot of both the field and stator is divided into two sections by means of insulation 17 and 18, respectively. The coil sides of one generator are on one side of the insulation and the coil sides of the other generator are on the other side of the insulation. As shown in FIG. 1, the radially inner or eight pole winding 19 has a coil pitch of five. This winding coacts with the radially inner winding 21 in the field which has a pitch of six. These two windings coact to produce an electrical power characteristic of a conventional eight pole generator. The radially outer windings 22 in the stator has a coil pitch of seven. The radially outer coils 23 in the field has a coil pitch of ten. The radially outer coils of both the field and stator coact to produce an electric power characteristic of a four pole machine.

Because of the particular coil pitches selected herein only a minimum of electrical interaction exists between the four and eight pole windings. It will be obvious that numerous other coil pitch combinations can be effected to produce independent electrical powers having minimum interaction. The disclosed and described four and eight pole windings are shown herein as examples of a particular type of duplex generator that is possible with the teachings of the subject invention.

With the above described invention it can be seen that two or more electrical powers can be produced by causing windings to be stacked concentrically on one another. Whereas, in the past these windings and their respective magnetic cores were axially spaced from one another, with the subject invention it is possible to produce independent electrical powers with substantially half the axial space previously required. This not only is a savings in space and weight, but in many instances results in a less costly machine.

Although only one embodiment of the subject invention has been shown and described herein, different embodiments will be obvious to persons having skill in the art and it is intended that all such embodiments as come within a reasonable interpretation of the appended claims be covered.

The embodiments of the invention in which an exclusive property or privilege is claimed are defined as follows.

We claim:

1. A multiplex generator having at least two output frequencies comprising: a single rotating element having at least a pair of individually electrically insulated concentric radially aligned coil sets A and B each with a different coil pitch and different electrical connection so that each coil set has a different number of poles; and a single stationary element concentric with said rotating element having at least a pair of individually electrically insulated concentric radially aligned coil sets $x$ and $y$ each set with a different coil pitch and a different electrical connection so that each coil set has a different number of poles the coil sets A and $x$ having an equal number of poles and the coil sets B and $y$ having an equal number of poles.

2. A multiplex generator having at least two output frequencies comprising: a single stationary element; and a single rotating element concentric with said stationary element, one of said elements having at least a pair of individually electrically insulated concentric radially aligned coil sets each with a different coil pitch and different electrical connection so that each coil has a different number of poles, the other of said elements having at least a pair of individually electrically insulated concentric radially aligned coil sets each with a different coil pitch and different electrical connection so that each coil has a different number of poles, one set of stationary coils and one set of rotating coils having an equal number of poles and coacting to induce a first voltage in one of said sets of coils and the other set of stationary coils and other set of rotating coils having an equal number of poles and coacting to induce a second voltage in a like one of said other coil sets because of generator action therebetween.

3. The multiplex generator set forth in claim 1 wherein the coil sets A and $x$ coact to induce a first voltage in the stationary coil $x$ because of generator action therebetween and the coils B and $y$ coacting to induce a voltage in the stationary coil $y$ because of generator action therebetween, and the coil pitch of each coil being such as to produce a minimum interaction between coacting generating pairs of coils.

4. The multiplex generator set forth in claim 2 wherein said other of said elements is said single stationary element and is of the direct current type.

5. The multiplex generator set forth in claim 2 wherein said other of said elements is said rotating element.

References Cited

UNITED STATES PATENTS

| | | | |
|---|---|---|---|
| 1,477,271 | 12/1923 | Lowenstein | 310—113 |
| 2,064,585 | 12/1936 | Wolkoff | 310—113 |
| 2,069,780 | 2/1937 | Severy | 310—170 |

MILTON O. HIRSHFIELD, *Primary Examiner.*

L. L. SMITH, *Assistant Examiner.*

U.S. Cl. X.R.

310—141